May 10, 1960 J. H. ALEXANDER ET AL 2,936,115

ARITHMETIC UNIT FOR DIGITAL COMPUTER

Filed Feb. 18, 1954 5 Sheets-Sheet 1

INVENTORS
James H. Alexander
BY Arthur W. Burks
Donald A. Flanders
Roland A. Anderson
ATTORNEY

ARITHMETIC UNIT FOR DIGITAL COMPUTER

Filed Feb. 18, 1954 5 Sheets-Sheet 2

INVENTORS
James H. Alexander
BY Arthur W. Burks
Donald A. Flanders
Roland A. Anderson
ATTORNEY

ARITHMETIC UNIT FOR DIGITAL COMPUTER

Filed Feb. 18, 1954 5 Sheets-Sheet 3

INVENTORS
James H. Alexander
Arthur W. Burks
Donald A. Flanders
BY
ATTORNEY

ARITHMETIC UNIT FOR DIGITAL COMPUTER

Filed Feb. 18, 1954 5 Sheets-Sheet 4

INVENTORS
James H. Alexander
BY Arthur W. Burks
Donald A. Flanders
Roland A. Anderson
ATTORNEY May 10, 1960 J. H. ALEXANDER ET AL 2,936,115

ARITHMETIC UNIT FOR DIGITAL COMPUTER

Filed Feb. 18, 1954 5 Sheets-Sheet 5

INVENTORS
James H. Alexander
BY Arthur W. Burks
Donald A. Flanders
Roland A. Anderson
ATTORNEY United States Patent Office 2,936,115

Patented May 10, 1960

2,936,115

ARITHMETIC UNIT FOR DIGITAL COMPUTER

James H. Alexander, New York, N.Y., Arthur W. Burks, Ann Arbor, Mich., and Donald A. Flanders, Chicago, Ill., assignors, by direct and mesne assignments, to the United States of America as represented by the United States Atomic Energy Commission Application February 18, 1954, Serial No. 411,294

5 Claims. (Cl. 235—164)

The present invention relates to computing machines, and more especially to a novel method of and apparatus for performing arithmetic operations with binary numbers in a computing machine.

One frequently used method of representing algebraically signed binary numbers in an automatic computing machine is the fixed point 2-complement system, in which only numbers between +1 and −1 are directly handled by the machine. Numbers between −1 and +1 will be considered as being "in range." In this system a positive or zero number is represented by a sequence of digits (0 or 1) corresponding to decreasing powers of 2, starting with the 0th power, i.e. $2^0, 2^{-1}, \ldots, 2^{-n}$. A negative number is represented by the complement of its absolute value. For example, a negative number $a$ whose absolute value is $b$ ($<1$) is represented by $2-b$, i.e. by $2+a$. Since $b<1$, $2-b>1$, so every in-range negative number is represented by a positive number greater than one. Thus in the machine representation negative numbers are distinguished from positive and zero numbers by the fact that the former have "1" in the first "place," while the latter have "0" in the first "place." The digit in this first "place" is therefore called the "sign digit."

One difficulty in prior multiplication devices using the complementing system for negative numbers is the necessity to make one or more of several alternative corrections to the product when one or both numbers are negative. For example, the product of a positive number $q$ and a negative number $-b$ should be $-bq$. Yet in the machine, $-b$ is represented as $2-b$ in binary notation and $-bq$ by $2-bq$. The machine's product of $-b$ times $q$ is $q(2-b)$, or $2q-qb$. Therefore, a correction of $2-2q$ must be made to the machine product to obtain the desired representation of the product $-qb$ whenever the numbers are multiplied together in a computer. But this correction factor cannot be used in the case where both numbers $q$ and $b$ are negative. In that case, the factors are represented as $2-q$ and $2-b$ and the product by $qb$. Then the machine's product would be $4-2q-2b+qb$, so that a different, more complex correction, of amount $(-4+2q+2b)$, is required to obtain the true product $qb$ rather than the correction $2-2q$, as in the former example. In other operating machines, there are alternative operations which must be performed, depending upon whether the multiplicand or multiplier is negative, and means must be provided to sense such conditions and direct operation accordingly. Hence it is evident that no universal correction factor can be built into the multiplication systems of the prior art. See a description of multiplication in the Institute for Advanced Study computer in "Proceedings of the Association of Computing Machinery, Meeting at Toronto, Ontario," pp. 95–109, for example.

Another difficulty with automatic multiplication in a fixed point 2-complement system having a range of +1 and −1 is that the numbers may go out of range, or "overflow" the design limits. Some means for detecting such overflow is desirable; otherwise, quite large inaccuracies may result from the misinformation accumulated during a lengthy computing sequence. Mere inspection of the number in the machine registers will not detect the error, since there is no apparent difference between a positive number greater than one and a legitimate negative number, represented as greater than 1, as is above described. Moreover, extra "carry" or "overflow" which occurs when a number is formed that exceeds +1 or is less than −1 is, in effect, lost in conventional systems. Therefore, the only ways to detect illegitimate numbers in computers of the prior art were either to find how the suspect number was obtained by tracing back through the computation steps, or to provide a separate memory for each step and to inspect each memory continuously.

With a knowledge of the shortcomings of devices of the prior art, applicants have devised a novel method of and apparatus for automatic, accurate computation requiring only a single, constant multiplication sequence, easily and automatically included in machine operation, in which any errors due to "overflow" during computation may be instantly detected.

Accordingly, it is the primary object of applicants' invention to provide a method of and apparatus for automatic, accurate computation.

Another object of the invention is to provide a novel arithmetic unit for a computing machine and means for directing computations therein according to a novel routine or algorithm, whereby automatic, accurate computation may be achieved and any machine errors due to computed numbers exceeding machine limits may be easily detected.

Other objects and advantages of the present invention will be apparent from a study of the following detailed description of a preferred embodiment thereof, when read in connection with the appended drawings, wherein.

The mathematical basis of the electronic mechanisms to be described is the following: The 2-complement fixed point representation described above is capable of a slight generalization and of a different interpretation. Consider first a negative number $a$, $=-b$, with $0<b<1$. But $a$ may be written in the form $$a=-1+(1+a)=-1+(1-b)$$

Since $0<b<1$, $0<1-b<1$. Thus $a$ is represented as −1 plus a positive number less than 1. The conventional system represents $a$ as $2+a=2-b=1+(1-b)$, i.e. as +1 plus a positive number less than 1. Either system represents $a$ by the same set of digits, and a register in the machine cannot tell the difference. If, however, the wiring of the operations in the machine is arranged to treat the sign digit as negative, the treatment of the representation of the number may be made to be different. Positive numbers are equally well handled in this interpretation, since $-0+a=a$. Along with this goes the minor, but useful, fact that the sequence of the digits 1.0 . . . 0, which is ambiguous in the conventional interpretation, is now consistently treated as representing −1.

The application of this interpretation to multiplication is as follows: Let $q$ and $b$ be in-range numbers, positive, negative or zero. $q$ is represented by $q_0.q_1 \ldots q_n$, where $q = -q_0.2^0 + q_1.2^{-1} + q_2.2^{-2} + \ldots q_n.2^{-n}$. Then $$bq = -bq_0.2^0 + bq_1.2^{-1} + \ldots + bq_n.2^{-n}$$
$$= [(bq_n.2^{-1} + bq_{n-1}).2^{-1} + \ldots + bq_1]2^{-1} - bq_0$$

If we set $a^{(1)} = 2^{-1}bq_n$, $a^{(2)} = (a^{(1)} + bq_{n-1}).2^{-1}, \ldots,$ $a^{(n-1)} = (a^{(n-2)} + bq_2)2^{-1}$, $a^{(n)} = (a^{(n-1)} + bq_1)2^{-1}$, then $a^{(n)} = bq_1.2^{-1} + \ldots + bq_2.2^{-n}$ and $bq = a^{(n)} - bq_0$.

The other mathematical notion used is the following. It is obvious that if a positive number, $0.a_1a_2 \ldots a_n$, is preceded by another 0 its value is not altered, i.e. $00.a_1 \ldots a_n$ and $0.a_1 \ldots a_n$ have the same value. The same holds true when the sign digit of a negative number is repeated, provided we interpret only the first digit as negative. E.g. −½=−1+½ and is represented by 1.1. But −½=−2+1+½, and hence may be represented by 11.1. Thus in-range numbers may be represented by doubling the sign digit. But a sequence of digits having two different digits in front of the binary point must, according to our conventions, represent an "out-of-range" number. E.g. $01.a_1 \ldots a_n$ represents (−0.2)+1+a positive (or zero) number and hence is out of range. Similarly, $10.a_1 \ldots a_n$ represents (−1.2)+0+a non-negative number less than 1 so it also is out-of-range. If in-range numbers have their sign digits duplicated before addition (or subtraction) the sum (difference) will then be exhibited as being in-range or not according as the two digits preceding the binary point in the sum (difference) are alike or not.

Figure 1:
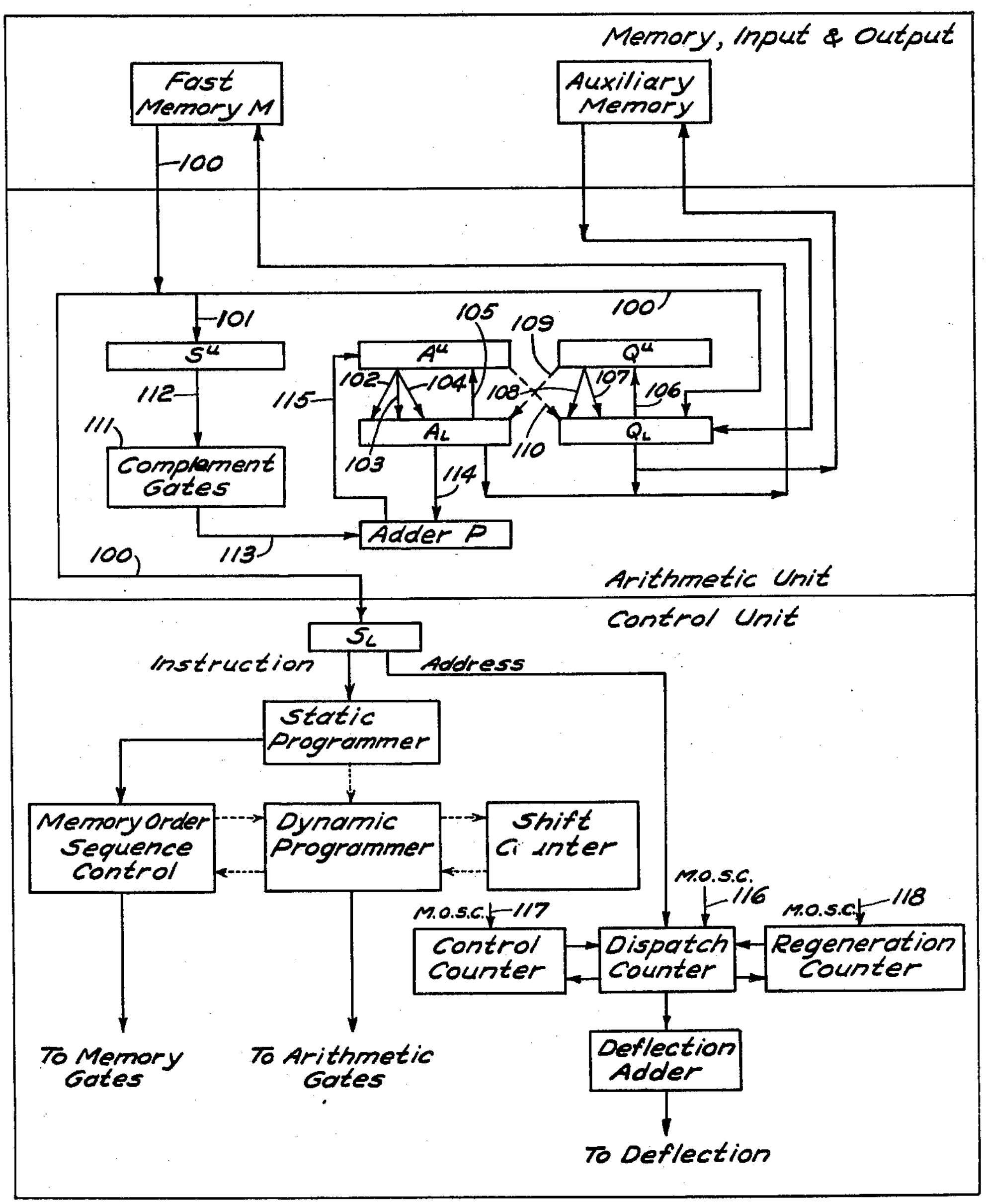
Figure 1 is a block diagram of the arithmetic unit and related portions of the control and memory systems of a computing machine incorporating the invention.

Referring now to Figure 1, computational information travels in parallel fashion along the solid lines and in serial fashion along the dashed lines, while control signals travel the dotted lines. The arithmetic unit proper comprises a logical adder P and five binary registers $S^u$, $A^u$, $A_L$, $Q^u$, and $Q_L$. The superscript "$u$" and subscript "L" indicate merely the physical location, upper or lower, of the registers in the computer structure. $S^u$ is a storage register which receives information along paths 100, 101 from the Fast Memory or information storage system, and may be utilized to store the multiplier in a multiplication operation. The accumulator registers $A^u$ and $A_L$ are interconnected through gates to permit shifting information directly up from $A_L$ to $A^u$ and directly down, down right, or down left from $A^u$ to $A_L$, as indicated by the solid lines 105, 102–104. The quotient registers $Q^u$ and $Q_L$ are also interconnected to allow shifting of information. Possible paths are from $Q_L$ directly up to $Q^u$ and from $Q^u$ down right or down left to $Q_L$, along lines 106–108. The accumulator and quotient registers are interconnected to allow transfer of information serially therebetween, as shown by the dashed lines 109–110. The multiplier may be taken from the memory and stored in the Q registers before multiplication along path 100. The adder P may comprise 41 binary stages connected to receive information from storage register $S^u$ through complement gates 111 along paths 112, 113, and also from register $A_L$ along path 114. Information from adder P may be transferred to register $A^u$ along path 115.

The arithmetic control may be asynchronous, and comprises a static programmer, a dynamic programmer, which generates the pulse routine to program the shift registers, and a shift counter, which may be a binary scaler. The dynamic programmer and shift counter units control the sub-cycle operation of the arithmetic unit, while the dispatch counter, control counter, regeneration counter and deflection adder control the address signal to the memory unit. The memory order sequence control, hereinafter referred to as the MOSC, controls the sequence of transfer to and from the memory and to the arithmetic unit, and conveys information between that unit and the memory control. The dispatch counter dispatches the address contained in a received order to the memory, the control counter follows the progress of execution of the order, and the regeneration counter keeps track of memory regeneration. These memory control counters may be interconnected by half-adders, not shown, which receive control signals from the MOSC along paths 116–118. The control system shown is of the type described generally in "Preliminary Discussion of the Logical Design of an Electronic Computing Instrument," by Burks, Goldstine, and von Neumann, Institute for Advanced Study, (1946). A typical control system of this type is specifically described in "Proceedings of the Association for Computing Machinery, Meeting in Toronto, Ontario," pp. 95–109, and in the "Sixth Interim Progress Report on the Physical Realization of an Electronic Computing Instrument," Institute for Advanced Study, (1951), pp. 70–98. See particularly pp. 73–82 and p. 18 of the last-named publication for descriptions of the shift counter and the clear selector, herein called the dynamic programmer. For a further description of the functions of the control unit shown in Figure 1, see p. 196 of "Proceedings of a Symposium on Large Scale Digital Computing Machines," August 3–5, 1953, Argonne National Laboratory Report ANL–5181, available from the Supt. of Documents, U.S. Government Printing Office, Washington, D.C.

The various registers in the machine, shown in block form in Figure 1, may comprise a plurality of distinct, denominationally ordered stages indicated by superscripts and subscripts 0–39. Registers $Q^u$, $Q_L$, and $S^u$ may contain forty such stages to accommodate "words" of forty binary digits length, for example. According to our invention, accumulator registers $A^u$ and $A_L$ and the adder P are provided with one extra stage, or forty-one stages each, with the extra stages, indicated by superscript and subscript "$x$," being utilized together with the sign digit storage stages, indicated by the superscript and subscript "0," to detect overflow, and thus detect computational errors, as is more fully described hereinafter.

Figure 2:
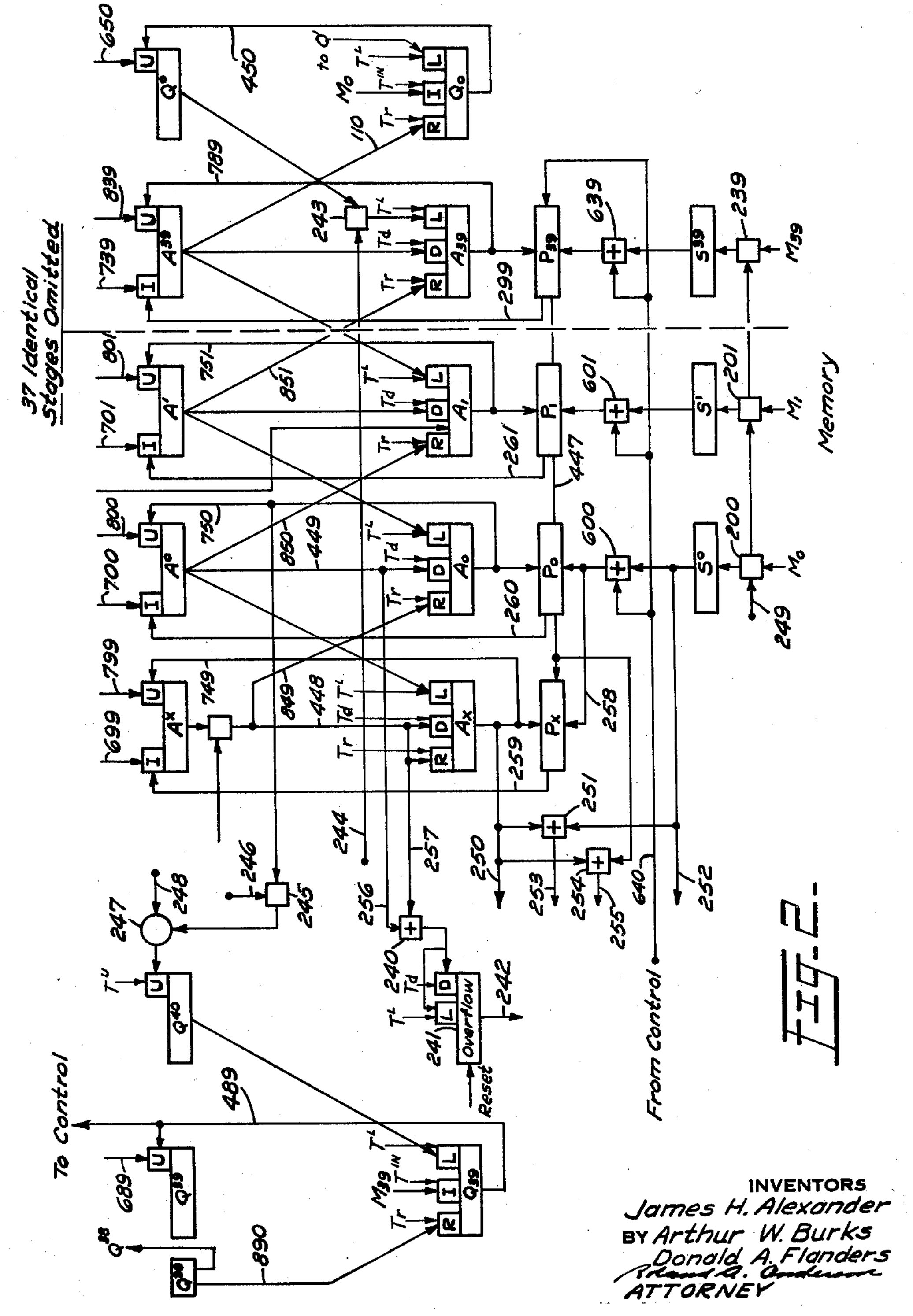
Figure 2 is a logical diagram showing in greater detail a selected portion of the arithmetic unit of Figure 1.

Referring now to Figure 2, individual register stages are represented by rectangles containing the stage identification. Of the upper accumulator register, the most significant digit stage $A^1$, the least significant digit stage $A^{39}$, the sign digit stage $A^0$, and the overflow stage $A^x$ are shown. The omitted stages $A^2 \ldots A^{38}$, as indicated by the dashed line between $A^1$ and $A^{39}$, are identical to $A^1$. Corresponding stages of the lower accumulator register $A_L$ and the adder P are shown directly below those of register $A^u$. The sign digit, most significant digit, and least significant digit stages of the storage and quotient registers are shown as $S^0$, $S^1$, $S^{39}$, $Q^0$, $Q^1$, $Q^{39}$, and $Q_0$, $Q_1$, $Q_{39}$ respectively. The solid lines extending from each numbered stage of $A^u$ to corresponding and next adjacent stages of $A_L$ indicate provision for shifting the contents of the stage in $A^u$ in parallel down, down left, or down right to $A_L$. The line from each stage of $A_L$ to the corresponding stage of $A^u$ indicates provision for shifting the contents of the stages in $A_L$ up to $A^u$ in parallel. The line from each stage of $A_L$ to the coresponding stage in P, that from each stage of $S^u$ to a corresponding stage in P, and that from each stage of P to a corresponding stage in $A^u$ likewise indicate provision for shifting information. Parallel shifting is also provided from each stage of $Q_L$ to the corresponding stage of $Q^u$, from each stage of $Q^u$ down right and down left to adjacent stages of $Q_L$, and serial shifting is provided from $Q^0$ to $A_{39}$, and from $A^{39}$ to $Q_0$. Information stored in memory M may be shifted into the stages of $S^u$ through appropriate gates 200–239, controlled by gating lead 249.

Logical "and" type gating circuits are indicated by small squares. The function of each transfer or shifting gate is indicated by the letter in the square. For example, "U" represents gates for transfer up, "D" stands for a transfer down gate, "L" stands for a transfer left gate and "R" stands for a transfer right gate. In the conventional manner, logical "and" gates, represented by squares, are opened by the coincidence of two input enabling signals, as is more fully described below. "Or" gates are represented by circles, and indicate a gate wherein either or both inputs will actuate the output. Half-adder type elements are indicated by squares surrounding a plus sign. These devices deliver an output corresponding to the sign of two input signals. Thus if the first input is unexcited, the signal at the second input is reproduced at the output, but if the first input be excited, then the second input signal is effectively inverted at the output. For example, half-adder 240 derives inputs from stages $A_x$ and $A_0$, and controls the state of overflow toggle 241 according as the inputs correspond or differ, as will be set forth more fully hereinafter.

Serial transfer of information from $Q^0$ to $A_{39}$ is provided through gate 243, controlled by an enabling signal on lead 244. Serial transfer of information from $A_0$ to $Q^{40}$ is provided through gate 245, controlled by an enabling signal on lead 246, and through gate 247, controlled by the signal on enabling lead 248. Information is gated in parallel from the memory $M_0$—$M_{39}$ into $S^0$—$S^{39}$ along the path 101 of Figure 1 by a signal on lead 249, and into $Q_L$ along path 100 (Figure 1) by a gating signal opening the "In" gates in the respective $Q_L$ stages. A "Complement" enabling signal on lead 640 opens the half-adder type gates 600—639 between $S^u$ and P.

Half-adder gates 251, 254 receive inputs as indicated and serve to control the performance of division commands. Since they do not relate to the multiplication or overflow operations, their functions will not be described.

Figure 3:
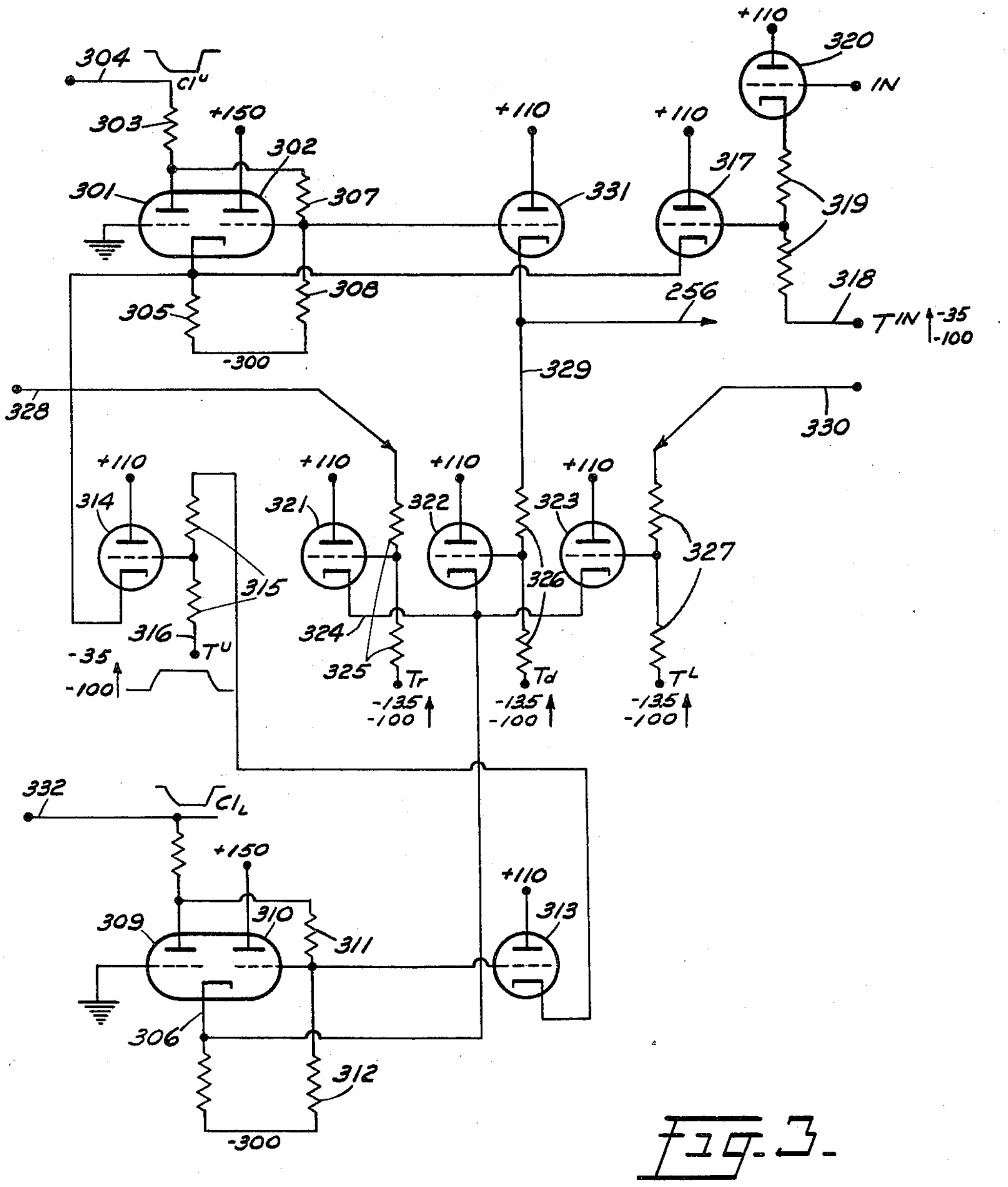
Figure 3 is a schematic drawing illustrating a preferred design of one of the denominationally ordered stages of the arithmetic registers shown in Figure 1.

A typical single stage of one of the arithmetic registers is shown in Figure 3. The stages may be based on symmetric or asymmetric toggles, but the latter are preferred. The register is arranged in two banks, $A^u$ and $A_L$, each corresponding stage comprising an upper toggle, a lower toggle, and interconnecting gates and drivers. The upper toggle comprises triodes 301, 302. The plate of triode 301 is coupled through plate resistor 303 to a "clear" lead 304 from a source normally at +110 volts D.C., the grid is grounded, and the cathode is coupled through resistor 305 to a source of —300 volts D.C. The plate of triode 302 is coupled directly to a source of +150 volts D.C., the grid is coupled to the junction of resistors 307, 308, and the cathode is common to that of triode 301. One terminal of resistor 307 is coupled to the plate of triode 301, and one terminal of resistor 308 is returned to the source of —300 volts. The lower toggle comprises triodes 309, 310 and associated resistors and power supplies and is identical to the upper toggle.

Tubes 313, 314, and resistor gate 315 constitute the "transfer up" circuit. The grid of tube 313 is coupled to the junction of resistors 311—312 and will assume a potential of either +30 volts or —8 volts, depending on the state of the lower toggle; that is, which one of tubes 309, 310 is conducting. Assuming that tubes 301, 310 are initially conducting, it is apparent first that the two toggles are in different states, and second that the grid of tube 313 is at its higher potential, since no current is flowing through tube 309 and its plate resistor. The cathode potential of tube 313 is determined by the voltage on lead 316.

Normally the lead is maintained at —100 volts D.C., so that tube 313 will conduct independently of its grid potential. A "transfer up" pulse on lead 316 raises that lead potential to about —35 volts D.C., as is shown in the waveform $T^u$. The new, higher potential at its cathode will cut off tube 313 only if its grid is at the lower of its two possible potentials. But as aforesaid the grid is at its higher potential, so the tube remains conducting, and the cathode potential will remain high, allowing the potential of the grid of tube 314 to rise with the transfer pulse. Tube 314 will then conduct and the potential of its cathode and the common cathode of the upper toggle will rise, causing tube 301 to cut off. Tube 302 will then conduct, due to the rise in its grid potential. When the common cathode potential is allowed to fall by removal of the "transfer up" pulse from lead 316, the grid of conducting tube 302 is higher than ground, so tube 302 will continue to conduct. Thus the state of the upper-rank toggle has been changed to conform with that of the lower-rank toggle, or, in computer terminology, information has been transferred from $A_L$ up to $A^u$.

The "transfer-in" gating circuit comprises toggle driver 317, gating lead 318, resistor gate 319, and gate driver 320, and is similar in operation to the above-described "transfer-up" circuit.

The "transfer right," "transfer left," and "transfer down" circuits operate similarly. The tubes 321–323 are the toggle driver tubes, and may have their cathodes tied to a common lead 324 which is coupled to the common cathode 306 of the lower toggle. Each tube is supplied from a separate source of +110 volts D.C. Respective resistor gates 325, 326, 327 are provided with corresponding gating leads 328, 329, 330 to which are coupled respective gate driver tubes such as tube 331. The other two gate drivers are not shown, as they are associated with the next adjacent register stages. The gate drivers are conducting or non-conducting, depending on the state of the corresponding toggle to which their grids are coupled, and the cathode potentials of the gate drivers determine the potential at one terminal of the respective resistor gate, as above-described. To effect a transfer right, left, or down, the corresponding gating lead is supplied with a transfer pulse going from —100 to —13.5 volts, resulting in a driving of the lower toggle to the appropriate state.

Clearing the toggles to a predetermined state is accomplished by lowering the plate voltage of the left-hand tubes of the toggles (tubes 301, 309), thus lowering the grid potential of the right-hand tubes 302, 310, below cut-off and causing tubes 301, 309 to conduct. Minimum clearing time is about 1 microsecond and transfer time is about 1.2 microseconds.

The adder P shown in Figure 1 may be of conventional construction of the type wherein binary numbers may be transferred in and out in parallel, and wherein the transferred number is added to the previous contents of the adder automatically upon such transfer in. The number of individual adder units required is equal to the maximum number of digits of the numbers to be handled, or 40 in the embodiment described, plus 1 extra stage $P_X$ for overflow detection.

Figure 5:
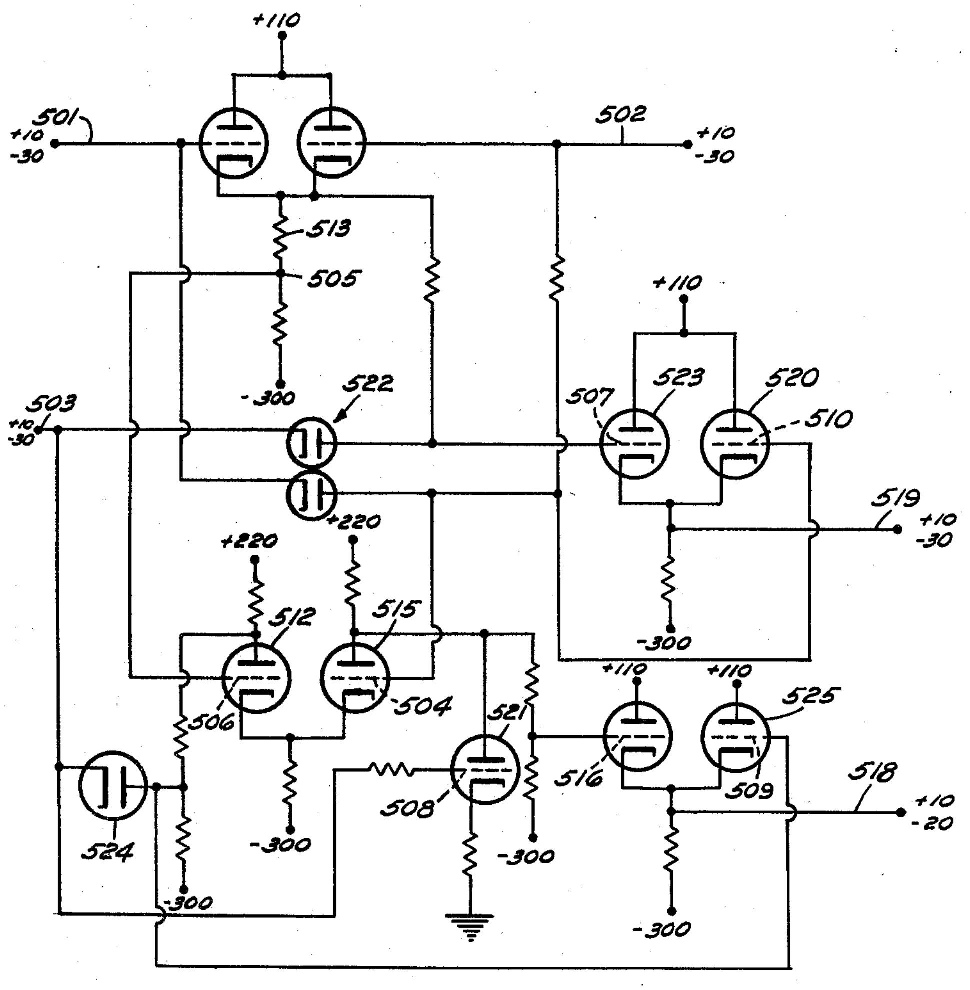
Figure 5 illustrates a single stage of a preferred adder circuit utilized in the arithmetic unit, shown in block form in certain other figures.

A sample stage of a preferred adder circuit, not designed by the present inventors, is shown in Figure 5. For other similar, suitable devices, see High-Speed Computing Device, Engineering Research Associates, 1950, chapter 13.

Design of the present adder is based on the fact that in adding binary numbers, a carry is produced by a pair of ones, and will continue if either of the next pair of digits added is a one. The carry will stop only if both digits are zeros. Therefore, the present adder senses the pairs of digits and produces a carry at every stage until two zeros appear, at which stage it stops the carry. A gate is arranged so that a carry entering from the right will continue through the gate, or can be started by the presence of two ones in this stage, or can be stopped by the presence of two zeros in the stage.

Moreover, the single stage shown provides, in addition to the carry information, the sum of the numbers introduced. If the two numbers added are alike, the carry input number is equal to the sum. If the two numbers are unlike, the carry input number is inverted and is then equal to the sum.

Referring now to Figure 5, input 501 derives a signal from the toggle holding the resident digit, while input 502 derives a signal corresponding to the incident digit. Cathode 513 will follow the higher of the two grids, and will rise in potential if a one signal is impressed on either input. The incident digit input signal is also impressed on grid 504, while the voltage at point 505 is impressed on grid 506. The carry input 503 is impressed on grids 507—509.

To illustrate the operation of the stage, assume a "1" resident digit, a "1" incident digit, and a "carry in." Then inputs 501, 502, and 503 will each be at +10 volts. Point 505 on the voltage divider and grid 506 will be at 0 volts. Tube 515 will conduct because of the positive signal on grid 504, thus raising the cathode potential to above 0 volts. Therefore, tube 512 will be cut off, and grid 509, which is connected to the plate of tube 512 through a voltage divider network, will assume its highest potential. Since grid 509 is above cut-off, and the cathode line 518 will rise to +10 volts, representing a 1. Carry out-put line 519 will be at +10 volts if a positive signal appears at either grid 507 or grid 510. Since both grids are at +10 volts, line 519 assumes that potential, representing an output carry signal.

To further illustrate operation of the circuit, if the resident digit is "1," the incident digit "0," and "no carry" enters line 503, then a "1" should be set up on line 518 and "no carry" on line 519. Since cathode 513 follows the higher grid, it assumes a potential of +10 volts, raising grid 506 to 0 volts, dropping the plate potential of tube 512 to a low value, cutting off tube 525. Grids 504, 510 assume −30 volts, cutting off tubes 515, 520. Line 503 assumes −30 volts, cutting off tube 521, allowing diode 522 to conduct, lowering the potential at grid 507 to cut off tube 523. Since tubes 520 and 523 are both cut off, output line 519 will assume −30 volts, the signal for "no carry." Diode 524 also conducts, holding grid 509 below cut-off. But the tube including grid 516 conducts, raising the potential of line 518 to +10 volts, the signal for "1."

Operation of the interrelated computer units above described is directed by a series of timed pulses from a control system. Multiplication of a 39-digit number "$b$" by a 39-digit number "$q$" according to novel method we have invented, involving the algorithm $bq=a^{(39)}-bq_0$, is described in detail below. Reference is made to the numerals on the typical stage of Figure 3 for clarity, and to the logical diagram of Figure 2 where necessary.

Step 1: Multiplier $q$ is selected from its position in memory $M_0 \ldots M_{39}$ in the conventional manner and delivered through respective "in" gates to shifting register $Q_L$ in the form $q_0.q_1\, q_2 \ldots q_{39}$, where $q_0$, the sign digit, is "1" for a negative number and "0" for a positive number. To accomplish such transfer, a control pulse is delivered to the respective "$T^{IN}$" leads 318 of the $Q_L$ stages in order to open the "IN" gates.

Step 2: Arithmetic accumulator shifting registers $A^u$ and $A_L$ are cleared to "0" by pulsing "clear" leads 304, 332.

Step 3: Multiplicand $b$ is selected from the Memory M and placed in register $S^u$ in the form $b_0.b_1\, b_2 \ldots b_{39}$ by pulsing lead 249 to open gates 200—239. From $S^u$, $b$ automatically enters adder P through the half-adder gates 600—639, as described supra.

Step 4: The product of $b$ times the least significant digit $q_{39}$ is effectively taken and put in adder P where it is added to the contents of $A_L$, now zero. This is accomplished by the control unit, which receives lead 489 from $Q_{39}$, and in response to the signal thereon directs either ($a$) transfer of the contents of adder P to accumulator $A^u$ by pulsing gate control leads 699—739 if $Q_{39}=1$, or ($b$) no transfer, if $Q_{39}=0$, in the conventional manner described in the "Sixth Interim Progress Report," supra, in connection with Figure 12 (page 18) of the publication.

Step 5: If there was a transfer to $A^u$ in step 4 ($q_{39}=1$), then the contents of P, now $+bq_{39}$, were transferred to $A^u$ through respective "input" gates "I" along the paths 259—299. Control enabling pulses on leads 699—739 open those gates. If the partial sum from P was not transferred ($q_{39}=0$), then the contents of $A_L$ are shifted $A^u$ along paths 749—789 and through "up" gates "U" by enabling pulses from control on leads 799—839 to open those gates, and again $A^u$ contains $+bq_{39}$.

Step 6: Simultaneously with either operation in step 5, multiplier $q$ is transferred from $Q_L$ to $Q^u$ along paths 450 . . . 489 by enabling pulses from control on leads 650 . . . 689 to open the "up" gates.

Step 7: The product now in $A^u$ is effectively multiplied by $2^{-1}$ by a "down-right" shift from $A^u$ to $A_L$, along paths 849—851, 110 and through respective "R" gates, so that $Q_0$ and $A_L$ now hold $a^1=(bq_{39})2^{-1}$. The sign digit from $A^x$ in addition to being shifted down-right along lead 849 is also shifted down to register $A_x$ along lead 448.

Step 8: The multiplier is simultaneously positioned for its next operation by a like shift from $Q^u$ to $Q_L$ through the "R" gates in the Q register along the paths corresponding to path 890 from $Q^{38}$ to $Q_{39}$, so that $q_{38}$, the 38th digit of $q$, now is in the 39th register stage $Q_{39}$.

Step 9: The adder P receives the partial product from register $A_L$, which is connected directly to adder P as shown in Figure 2, and adds it to the multiplicand $b$ from register $S^u$, which is also connected to P through half-adders 600—639, the addition process being described in connection with Figure 5.

Step 10: The contents $[(bq_{39})2^{-1}+bq_{38}]$ of P, or the contents $[(bq_{39})2^{-1}]$ of $A_L$ are again transferred to $A^u$ as in step 5, depending on whether the digit in $Q_{39}$ is "1" or "0" by a signal from control to either the "In" gates or "Up" gates in $A^u$.

Step 11: Multiplier $q$ is transferred from $Q_L$ to $Q^u$ along paths 450—489 and through the Q "Up" gates simultaneously with step 10 by pulses from control on leads 650—689.

Steps 12 and 13: The partial product is multiplied again by $2^{-1}$, and $q_{37}$ is shifted into $Q_{39}$, by "down-right" shifts from $A^u$ to $A_L$ and $Q^u$ to $Q_L$.

Step 14: The above steps 9–13 are repeated until the most significant digit of the multiplier, $q_1$, has been utilized, and $q_0$, the sign digit, is in $Q_{39}$. The shift counter stops repetition of the steps after 39 multiplier shifts, in the conventional manner.

Step 15: Then, according as $q_0$ is ($a$) "0" or ($b$) "1," the control will ($a$) do nothing to the product in P, the "In" gates to $A^u$ being closed, while the contents of $A_L$ are transferred through "Up" gates to $A^u$, as in step 5, or ($b$) transfer the contents of P to the accumulator through the "In" gates to $A^u$, as in step 4. The shift counter output after 39 steps energized the complement gate lead 640 to gates 600—639 between $S^u$ and P, also adding 1 to $P_{39}$ so as to form a true binary complement. Gates 600—639 are, in effect, a pair of alternate paths for information, one of which transmits it unchanged while the other effects inversion. Enabling lead 640 opens the latter paths to admit the complement of $b$ into P, thus effectively subtracting ($bq_0$) from the product stored there, and forming $[a^{(39)}-bq_0]$, which is the desired product according to the above-stated algorithm.

The intermediate sums formed may be out of range, but will not trip the overflow toggle 241 because they are always transferred "down-right," while the toggle may be tripped only on "down" and "downleft" shifts. Since $b$ and $q$ are both less than +1 and equal to or greater than −1, their product is always between +1 and −1 except in case $b=q=-1$. In that case, the subtraction step above will set the overflow toggle as the result passes down from $A^u$ to $A_L$, because the voltage levels on leads 256, 257 will be different, thus indicating that the product held is out of range.

Unbiased round-off may be readily obtained by inserting a 1 into the most significant digit stage $A_1$ at the same time the rest of A is cleared to 0. Provision is made for clearing that stage to 1 by lowering the plate voltage of the right-hand tube in its toggle. After 39 shifting steps the $2^{-1}$ has been multiplied by $2^{-39}$, so that in effect $2^{-40}$ has been added to the product, and A contains 39 digits of $bq$ plus $2^{-40}$, which is an accurate, unbiased round off.

As has been mentioned above, three extra stages $A^x$, $A_x$, and $P_x$ are provided in the registers $A^u$, $A_L$, and P, and are connected respectively to the sign digit-stage $A^0$, $A_0$, and $P_0$. A digit $b_x$ identical to the sign digit $b_0$ of the stored number is inserted automatically into $P_0$ and $P_x$ by virtue of the direct connection 258 between half adder 400 and $P_x$. From $P_x$ and $P_0$ the information is transferred up to $A^x$ and $A^0$ along paths 259, 260 and through the In Gates and down to $A_x$ and $A_0$ through the down gates along paths 448, 449.

If at any time a "down" or a "downleft" shift operation in the computer involves a carry between $P_1$ and $P_0$ on lead 447, such that the sign digit in $P_0$ would change, the associated arithmetic register stage $A^0$ will change and differ from $A^x$, a special toggle 241 is actuated by half-adder 240 when $A^x$ and $A^0$ differ, to give warning that overflow has occurred. This toggle may be provided with a neon tube for visual inspection at the end of each computation, or as often as desired during a particular operation. In addition, it may be used to provide a signal along lead 242 to a warning light or audible alarm, or to stop the computer operation, if desired.

If a number greater than ½ is multiplied by 2 by shifting left, an overflow will result, because the most significant digit $b_1$, stored in $A_1$ and $P_1$, is binary "1." Since a left shift must go from $A_L$ up to $A^u$, then down left to $A_L$, along the paths shown on the figure, the 1 stored in $A_1$ is first transferred up to $A^1$. Then the 1 is transferred down-left, flipping toggle $A_0$ to its opposite state. When the number in $A_L$ is next transferred up to $A^u$, the 1 now stored in $A_0$ will cause $A^0$ to change state, so that it will differ from $A^x$. The half-adder circuit 240 is actuated by the change in $A^0$ through lead 256, and delivers a signal to set the special toggle 241 accordingly. Similar remarks apply to the detection of overflow resulting from multiplying a number less than −½ by 2.

Figure 4:
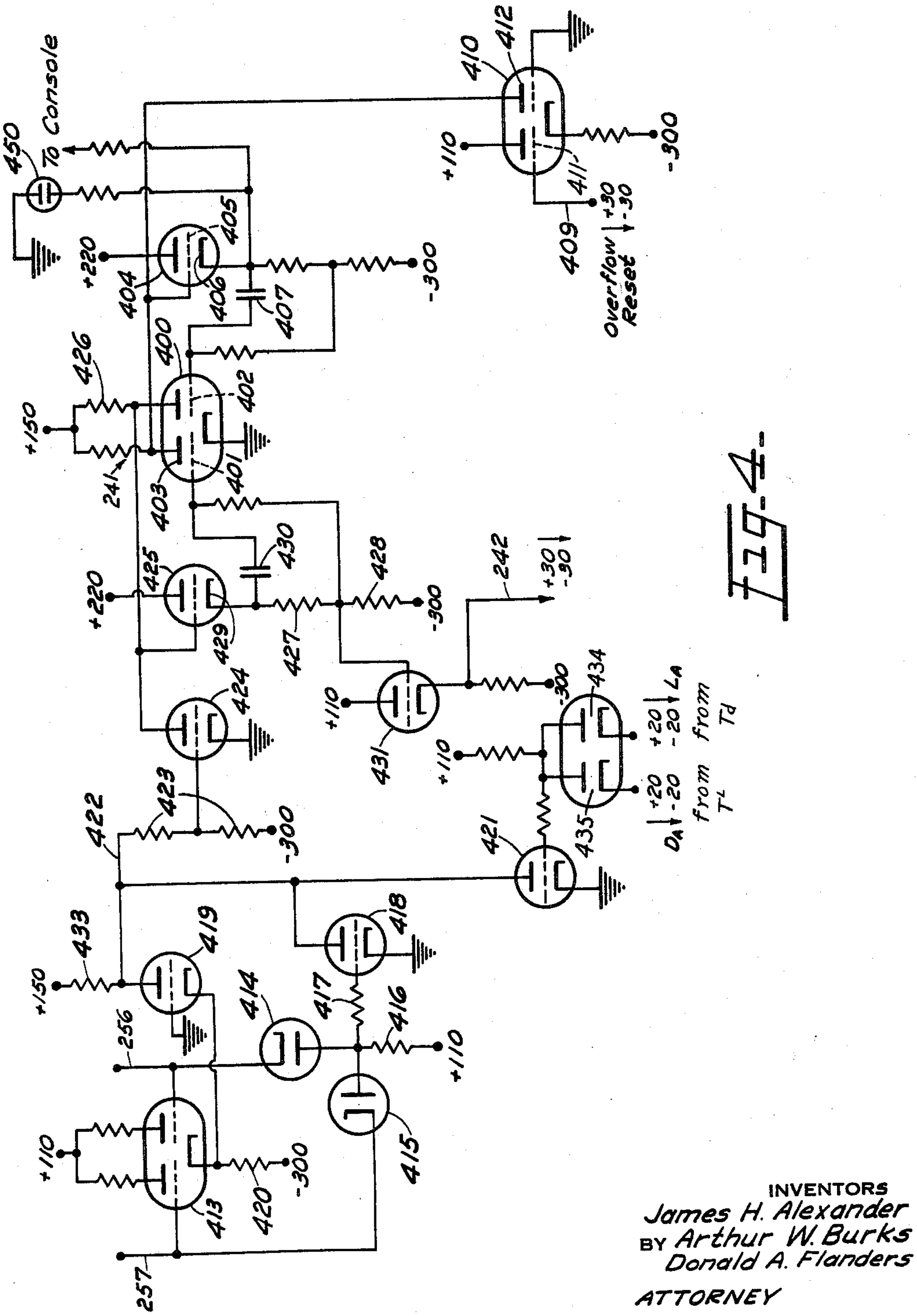
Figure 4 is a schematic diagram illustrating a preferred design of certain arithmetic registers wherein special arrangement for overflow detection have been provided, as shown in block form in Figure 2.

Referring now to Figure 4, the overflow toggle 241 may comprise a twin-triode tube 400 having a grounded common cathode and separate anodes energized from a source of potential through respective anode resistors. Grid 401 is disposed in the input circuit, grid 402 receives reset signals, and anode 403 is disposed in the output circuit. Triode tube 404 is energized from a separate source of potential and receives input signals on its grid 405 from anode 403. Neon bulb 450 is resistively coupled between cathode 406 and ground so that it will conduct only when tube 404 conducts sufficiently to raise cathode 406 above the firing potential of the bulb. For resetting the toggle, an external reset pulse going from +30 to −30 volts is impressed on lead 409, which is coupled to one grid 411 of twin-triode tube 410, the opposite grid of which is grounded. A negative output signal is taken from anode 412 as the right half of tube 410 conducts and coupled to grid 405 to cut off tube 404, thereby transmitting a negative pulse to grid 402 through condenser 407 to cut off the right half of toggle 400, thus resetting it to the desired state.

Signals from stages $A^0$ and $A^x$ are taken on leads 256, 257 and applied to respective grids of twin-triode tube 413. Both halves or sections of the tube are energized from a common source of potential through respective anode resistors and a common cathode resistor 420. Triode tube 419 is energized from a separate source of potential through anode resistor 433 and cathode resistor 420 while its grid is grounded. Leads 256, 257 are also coupled through a mixing network including diodes 414, 415 and resistors 416, 417 to the grid of triode tube 418, the cathode of which is grounded while the anode is coupled to the anode of tubes 419, 421. The grid of tube 421 is coupled to a positive "and" gate including a pair of diodes 434, 435 having respective cathodes coupled to gating leads varying from −20 to +20 volts and their plates coupled together to a source of +110 volts. The common anode lead 422 is coupled through a voltage divider 423 to the grid of triode 424, the cathode of which is grounded while the anode is coupled to the grid of tube 425 and to a source of potential through resistor 426. The anode of tube 425 is coupled to a source of energizing potential, while the cathode 429 is returned through resistors 427, 428 to a source of negative potential. Condenser 430 couples the cathode 429 to grid 401, which is also coupled through a limiting resistor to the junction of cathode resistors 427, 428. The grid of tube 431 is also coupled to that junction, while the anode is coupled to an energizing source and the cathode is returned through a resistor to a source of negative potential. An output lead 242 is coupled to the cathode for deriving an "overflow" negative pulse as toggle 400 flips, for utilization either to stop computer operation, actuate an alarm, or as otherwise may be desired.

In operation, upon occurrence of overflow within the arithmetic unit A registers, toggle $A^0$ will will change state, altering the potential on lead 256 so that it differs from that on lead 257. Assuming that prior to the overflow both leads 256, 257 were operating at −25 volts, then lead 256 would assume a potential of +25 volts. The right half of tube 413 will conduct, raising the cathode potential above ground, thus cutting off tube 419. Tube 418 is cut off because the cathode of diode 415 remains at −25 volts, holding the grid potential of tube 418 at that voltage, which is below cut off. In normal operation, both diode cathodes are held at +20 volts, their plates are at +20 volts, and tube 421 conducts through resistor 433, dropping the grid voltage of tube 424 below cutoff. However, upon occurrence of a transfer "down" (T*d*) or "down-left" ($T^L$) signal, one of the diode cathodes fall to −20 volts, the plate follows the lowest cathode down, and tube 421 cuts off. No current flows through resistor 433, so that lead 422 rises to substantially +150 volts and tube 424 begins to conduct, drawing current through resistor 426 and cutting off tube 425. Cathode 429 will then fall in potential, and will pull grid 401 negative through the coupling condenser, cutting off the left section of the toggle. Tube 431 will also be cut off, driving lead 242 from +30 to −30 volts; grid 405 will be driven positive, making tube 404 conduct, raising the potential of cathode 406 and associated grid 402, thus allowing the right half of toggle 400 to conduct, and firing neon bulb 450.

If, on the contrary, both leads 256, 257 are initially at +30 volts, both sections of tube 413 will conduct, raising the cathode potential sufficiently to cut off tube 419. But tube 418 will conduct because of the positive potential impressed on its grid through the mixer diodes, and will draw current through resistor 433, lowering the potential of lead 422 sufficiently to cutting off tube 424. When lead 256 drops in potential to −25 volts, it will cut off the right half of tube 413, lowering the cathode potential somewhat, but not enough to allow tube 419 to conduct. Diode 414 will conduct more heavily, pulling the grid of tube 418 down to −25 volts, which is below cut off, so that no current flows through resistor 433. Lead 422 then will rise to substantially +150 volts, tube 424 will conduct, tube 425 will be cut off, and the left half of toggle 400 is cut off.

Since by the reset action above-described the right half of the toggle was cut off, it is apparent that cutting off the left half of the toggle flips it to the other stable state. Thus an overflow in the A registers both actuates the neon bulb indicator and produces a negative "overflow" pulse for further utilization as desired.

It will be apparent from the above description that we have invented a novel method of operation of an arithmetic unit of a computing machine and have provided novel apparatus for carrying that method into execution, whereby the 2-complement fixed point system of representation may be utilized, yet the ambiguities and possible error sources of the prior art have been eliminated without recourse to elaborate additional functional units for making multiplication corrections for "overflow" detection, and the like.

What is claimed is:

1. In a digital computer provided with a plurality of denominationally-ordered, multistage binary registers including a first n-stage register to receive the multiplicand and a first n-stage shifting register to receive the multiplier, where n is a selected number, means for shifting said multiplier successively toward the lowest-ordered stage, shift counter means to provide a completion signal after $n-1$ shifts, and digit sensing means coupled to said lowest-ordered stage in said first shifting register for generating first or second signals according to the stable state of said lowest-ordered stage, the improvement comprising: a double rank shifting accumulator register having $n+1$ stages; a binary adder including an adder stage associated with each accumulator register stage, each adder stage being provided with a first input coupled to a correspondingly ordered stage in a first rank of said accumulator register, a second input, a carry input coupled to the next-lowest ordered adder stage, a carry output connected to the next-highest ordered adder stage, and a sum output connected to a correspondingly ordered stage in a second rank of said accumulator register; a half-adder associated with each stage of said multiplicand register, each half-adder being provided with first and second inputs and a sum output, a common control lead energized by said completion signal and connected to each of said first inputs to said half-adders to provide first binary input signals, said second inputs of each half-adder stage being connected to the correspondingly-ordered multiplicand register stage to derive therefrom second binary input signals, said sum output of each stage being coupled to said second input of the correspondingly-ordered adder stage; means to set the two highest-ordered stages in each rank of said accumulator register to the same stable state; respective first gate circuits connected between corespondingly-ordered stages of said first and second ranks and provided with an input energized by said first control signals; respective second gate circuits connected between respective sum outputs of said adder and the correspondingly-ordered stage in said second rank and provided with an input energized by said second control signals; a second half-adder provided with inputs connected to the two highest-ordered stages of one rank of said accumulator register and a sum output for providing an overflow signal only when said stages assume different stable states.

2. In an arithmetic unit for a computer comprising a plurality of storage register, one of said registers being a double rank accumulator register, and a multistage adder, each of said registers comprising a plurality of discrete bistable stages for storage of the binary digits representing a number and one stage per register for storage of a binary digit representing the algebraic sign of the number, the improvement comprising: a pair of additional bistable stages identical to said one register stages and coupled to respective sign storage stages in respective ranks of said one register; means coupled to said sign stages for setting said additional stages to an electrical state corresponding with that of the respective sign storage stages prior to performance of an arithmetic operation; and means coupled to that additional stage coupled to said one register in a first rank and to the sign storage stage of said first rank said one register to derive signals therefrom indicative of the binary condition of said stages, said means being actuable responsive to a difference in character between said binary signals.

3. In a computing machine provided with a double rank, multistage, shifting register comprising two ranks of bistable toggle circuits, gating circuits for communicating between ranks, and denominationally-ordered stages comprising one corresponding toggle from each rank and the interconnecting gating circuits, the improvement comprising: a first bistable sign stage coupled to the highest-ordered number stage of said register; an additional bistable sign stage coupled to said first sign stage to form the highest-ordered stage; means for setting all said stages to a corresponding initial condition; an additional bistable toggle circuit having input and output circuits associated therewith; and a switching circuit having two input circuits and an output circuit associated therewith, the output circuit of said switching circuit being coupled to the input circuit of said additional toggle to actuate said toggle, one input circuit of said switching circuit being coupled to the highest-ordered stage in said register to derive a first potential therefrom, the other input circuit of said switching circuit being coupled to the second highest-ordered stage in said register to derive a second potential therefrom, said switching circuit being provided with a half-adder circuit connected to both said inputs to produce an output signal to actuate said toggle only when said first and second potential differ.

4. The apparatus of claim 3 wherein said additional toggle and its associated circuits comprises first and second electron tubes having respective input grids, output anodes, and a common cathode, a gas discharge glow tube, means coupling said glow tube to said toggle for firing said glow tube only when a selected said second electron tube is conducting, and means coupled to one of said grids for causing said first tube to normally conduct; and said switching circuit comprises third and fourth electron tubes having input grids and a common output cathode, two input leads coupled to said grids, a fifth electron tube having an input grid and an output anode, respective diodes coupling said input leads to said fifth tube grid, a sixth electron tube having a cathode coupled to the cathode of said third and fourth tube, a voltage divider coupled to the anode of said fifth and sixth tubes and to a source of D.C. potential, a seventh electron tube having an input grid coupled to a point on said divider normally below cut-off potential and an output anode, and an eighth electron tube having an input grid coupled to said seventh tube anode and an output cathode coupled to the grid of said first tube to cause said first tube to conduct only when said eighth tube conducts, whereby only a substantial difference in potential between said input leads effects an increase in current flow through said divider, thereby raising the potential of the grid of said seventh tube causing it to conduct, cutting off said eighth tube, cutting off said first tube, and firing said glow tube.

5. An arithemtic unit for obtaining the product of two binary numbers, each including a sign digit and $n-1$ magnitude digits, each number being represented by appropriate settings of binary storage elements arranged in registers, comprising: multiplicand, multiplier, and accumulator denominationally-ordered registers, said multiplier and accumulator registers being shifting registers, said accumulator register being provided with two corresponding ranks of binary storage elements, and each register being provided with parallel inputs and outputs; a denominationally ordered parallel adder having first digit inputs connected to one rank of said accumulator register, second digit inputs, and outputs; respective half-adder stages each having a first input coupled to said output of a corresponding stage of said multiplicand register, a second input, and a sum output coupled to said second digit adder inputs; respective first sets of gates coupling said adder outputs to inputs of the second rank of said accumulator register; respective second sets of gates coupling the outputs of said one rank to inputs of said second rank of said accumulator register; respective means coupling the output of the lowest-ordered stage of said multiplier register to said first and second sets of gates to energize one set of gates responsive to a first binary output therefrom and the other set of gates responsive to second binary output therefrom; means for periodically shifting both said shifting registers toward the lowest-ordered stage; and counting means coupled to one of said shifting registers for providing an output completion signal after $n-1$ shifts and provided with an output connected to said second half-adder inputs to energize the same, allowing the complement of the multiplicand to enter said adder, said output also being connected to said shifting means to disable the same after $n-1$ shifts.

References Cited in the file of this patent

"Functional Description of the Edvac"; vol. 1, page 4–7; vol. II, Fig. 104–3LC–1. Nov. 1, 1949.

Wilkes: "The Edsac—an Electronic Calculating Machine," Journal of Sci. Inst. and of Physics in Ind. (British), December 1949, pages 389, 390.

Engineering Research Associates, "High-Speed Computing Devices," 1950, page 271.

Argonne Nat. Lab., "Progress Report on the Argonne-Oak Ridge Digital Computer," March 5, 1951, pages 22*a*, 22*b*, 24 to 26, 38, 44, and in Fig. III. (11 (page 39), relied on.)

ORDVAC Manual, Illinois University, Ad104961, October 1951, complete copy at ASTIA section, Lib. of Congress; pages ii–iv, 5 to 7, 9 to 11, 14, 15, 23 to 25, 45 to 66, 129 to 132 relied on.

Estrin, "Description of the Electronic Computer at the Institute for Advanced Studies," Proc. Assoc, for Comp. Mach., September 1952, pages 101 and 109.

Proc. of the Assoc. for Computing Machinery, September 1952, "The Oak Ridge Automatic Computer," by Chu, pp. 142 to 147.

Electronic Engineering, October 1952, "The Physical Realization of an Electronic Digital Computer," by Booth (pp. 442–445).

Van Der Poel, "A Simple Electronic Digital Computer," Applied Scientific Research, October 1952, pages 396, 397.

Robinson: "Multiplication in the Manchester University High-Speed Digital Computer," Electronic Engineering, January 1953, page 6.

Buchholz: "System Design of the IBM Type 701 Computer," and Ross, "Arithmetic Element of the IBM Type 701 Computer," both articles in IRE Proc., October 1953, pages 1266, 1268 to 1270 and 1288 relied on.